United States Patent
Matsunami

(10) Patent No.: US 11,380,132 B2
(45) Date of Patent: Jul. 5, 2022

(54) FACE IMAGE PROCESSING APPARATUS AND FACE IMAGE PROCESSING METHOD

(71) Applicant: FUJITSU LIMITED, Kawasaki (JP)

(72) Inventor: Tomoaki Matsunami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 16/996,962

(22) Filed: Aug. 19, 2020

(65) Prior Publication Data
US 2021/0081652 A1    Mar. 18, 2021

(30) Foreign Application Priority Data
Sep. 13, 2019   (JP) .............................. JP2019-167688

(51) Int. Cl.
  *G06K 9/36*   (2006.01)
  *G06K 9/62*   (2022.01)
  *G06V 40/16*  (2022.01)
  *G06F 21/32*  (2013.01)

(52) U.S. Cl.
CPC ............ *G06V 40/171* (2022.01); *G06F 21/32* (2013.01); *G06V 40/169* (2022.01)

(58) Field of Classification Search
CPC . G06K 9/00221–2009/00328; G06K 9/00926; G06F 21/32; G06V 40/16–40/179; G06V 40/50–40/58
See application file for complete search history.

(56) References Cited

U.S. PATENT DOCUMENTS

| | | | |
|---|---|---|---|
| 2004/0062425 A1 | 4/2004 | Uchida | |
| 2006/0210124 A1* | 9/2006 | Ishii | ................... G06K 9/00281 |
| | | | 382/118 |
| 2008/0118158 A1 | 5/2008 | Mizoguchi et al. | |
| 2010/0067751 A1 | 3/2010 | Aoki | |
| 2018/0075291 A1* | 3/2018 | Tian | ................... G06K 9/00268 |
| 2019/0087937 A1* | 3/2019 | Saito | ......................... G06T 7/30 |

FOREIGN PATENT DOCUMENTS

| | | |
|---|---|---|
| JP | H10-021394 A | 1/1998 |
| JP | 2002-133423 A | 5/2002 |
| JP | 2004-118677 A | 4/2004 |
| JP | 2005-18466 A | 1/2005 |
| JP | 2008-243093 A1 | 10/2008 |

\* cited by examiner

*Primary Examiner* — Brian Werner
(74) *Attorney, Agent, or Firm* — Fujitsu Patent Center

(57) ABSTRACT

An image processing apparatus includes memory that stores a plurality of images acquired by image-capturing a face of a person; and a processor, coupled to the memory, configured to: acquire a pixel value pattern indicating a relationship between positions in a given direction and pixel values in an area having parts of the face of each of the plurality of images, and select an image to be processed from the plurality of images based on the pixel value patterns of the plurality of images.

12 Claims, 12 Drawing Sheets

FACE IMAGE PROCESSING APPARATUS AND FACE IMAGE PROCESSING METHOD

CROSS-REFERENCE TO RELATED APPLICATION

This application is based upon and claims the benefit of priority of the prior Japanese Patent Application No. 2019-167688, filed on Sep. 13, 2019, the entire contents of which are incorporated herein by reference.

FIELD

The embodiment discussed herein is related to an image processing apparatus, an image processing method, and an image processing program.

BACKGROUND

A biometric authentication technique is a technique that performs identity authentication by using biometric information on an authentication target person. The biometric authentication technique includes a face authentication technique, a fingerprint authentication technique, a vein authentication technique, a voice print authentication technique, and so on.

In the face authentication technique, identity authentication is performed by using biometric information acquired from a face image of an authentication target person. In this case, the image-capturing environment for capturing a face image often varies between registration processing for registering biometric information on a registration target person and authentication processing for authenticating an authentication target person.

For example, in the registration processing, a face image may be captured when a registration target person stays still and turns to the front. On the other hand, in the authentication processing, a face image may be captured while an authentication target person is walking. Because there is a possibility that face images of a face in different directions and facial expressions are captured in such authentication processing, registered biometric information and biometric information acquired for the authentication of an identical person may not agree, and the identity authentication may not succeed.

In relation to the face authentication technique, a new registration device for face image database that automates a work for database registration of a new person and a registration apparatus for registering dictionary data for pedestrian authentication based on face images have been known (see Japanese Laid-open Patent Publication No. 2002-133423 and Japanese Laid-open Patent Publication No. 2008-243093).

SUMMARY

According to an aspect of the embodiments, an apparatus includes a memory that stores a plurality of images acquired by image-capturing a face of a person; and a processor, coupled to the storage unit, configured to: acquire a pixel value pattern indicating a relationship between positions in a given direction and pixel values in an area having parts of the face of each of the plurality of images, and select an image to be processed from the plurality of images based on the pixel value patterns of the plurality of images.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

According to a face authentication technique in the past, it is difficult to select a face image that is proper for authentication processing from a plurality of face images acquired by capturing images of a walking authentication target person.

Such a problem also occurs when a face image that is proper for the registration processing is to be selected, without limiting to the case where a face image that is proper for the authentication processing is to be selected. the problem also occurs in various kinds of information processing using face images, without limiting to the identity authentication using a face image.

Hereinafter, an embodiment will be described in detail with reference to the drawings.

For example, according to the technology in Japanese Laid-open Patent Publication No. 2002-133423, the direction of a face to be used for frame selection is estimated by using a plurality of facial feature points detected from a face image by a personal face image detection, tracking and recognition system.

According to the technology in Japanese Laid-open Patent Publication No. 2008-243093, for the registration, attitude change data and walking data of a registration target person walking on a passage are registered as dictionary data. The attitude change data are data such as feature amounts of a face acquired from face images of a registration target person captured when the registration target person has various attitudes (face directions) at a plurality of points within a passage. The walking data are data such as attitude changes while the registration target person is walking on the passage. For authentication, an attitude is determined by using facial feature points such as eyes and nasal cavities extracted from a face image of a pedestrian, and a feature amount of the face of the pedestrian and a feature amount of the face in a close attitude recorded in dictionary data are compared.

By using such a face authentication technique, a plurality of face images is acquired by capturing moving images of a walking authentication target person, and a face image that is proper for authentication processing is selected from the face images so that the stability of the identity authentication may be improved.

However, the method that estimates the direction of a face by using a positional relationship of facial feature points representing facial parts such as eyes, a nose, and a mouth and selects a face image of the face in a direction close to the registered direction may not realize stable identity authentication. For example, there may be a case where a face image of the face in a direction different from the registered direction is selected as a result of improper detection of a facial feature point or a case where a face image of the face in the same direction as the registered direction but having a different facial expression such as a blink and opening of the mouth is selected.

Figure 1:
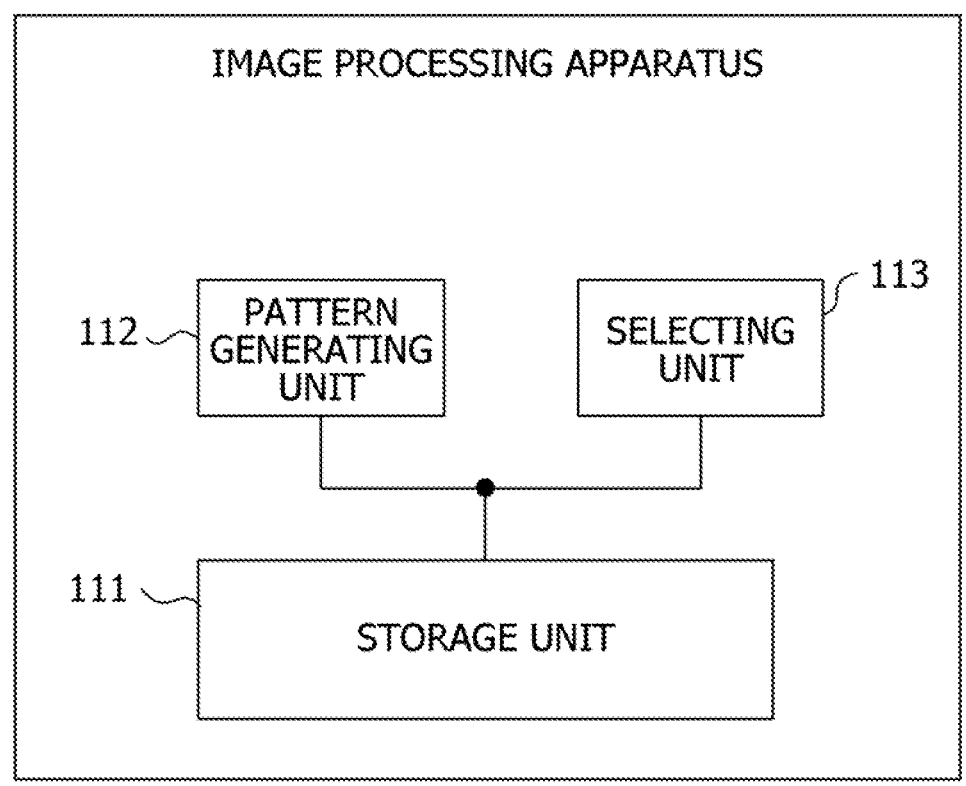
FIG. 1 is a functional configuration diagram of an image processing apparatus.

FIG. 1 illustrates a functional configuration example of an image processing apparatus of an embodiment. An image processing apparatus 101 in FIG. 1 includes a storage unit 111, a pattern generating unit 112, and a selecting unit 113. The storage unit 111 stores a plurality of images acquired by image-capturing a face of a person. The pattern generating unit 112 and the selecting unit 113 perform image processing by using the images stored in the storage unit 111.

Figure 2:
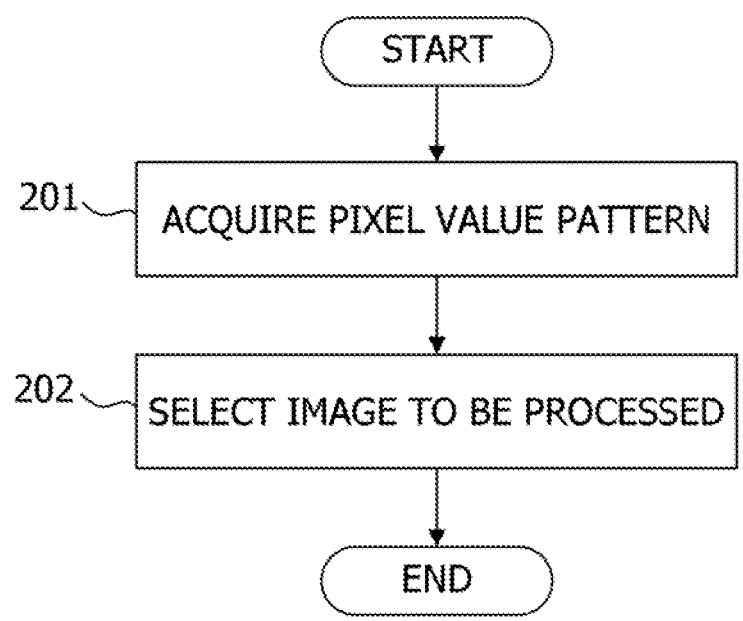
FIG. 2 is a flowchart of image processing.

FIG. 2 is a flowchart illustrating an example of image processing performed by the image processing apparatus 101 in FIG. 1. First, the pattern generating unit 112 acquires a pixel value pattern indicating a relationship between positions in a given direction and pixel values in areas having facial parts of each of a plurality of images (step 201). Next, the selecting unit 113 selects an image to be processed from the images based on the pixel value patterns of the plurality of images (step 202).

With the image processing apparatus 101 in FIG. 1, a proper image to be used for information processing may be selected from a plurality of images acquired by image-capturing a face of a person.

Figure 3:
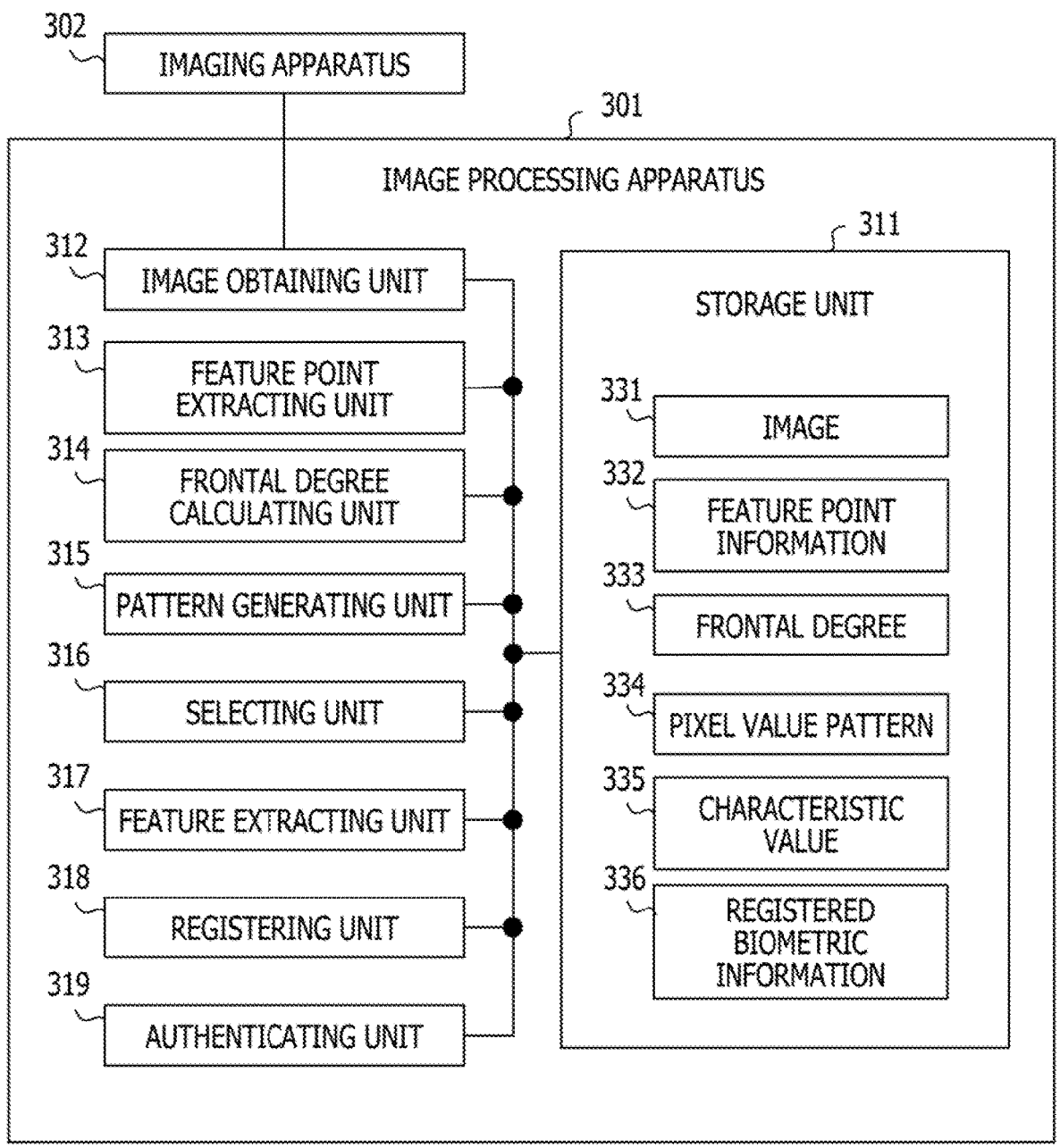
FIG. 3 is a functional configuration diagram illustrating a specific example of the image processing apparatus.

FIG. 3 illustrates a specific example of the image processing apparatus 101 in FIG. 1. An image processing apparatus 301 in FIG. 3 includes a storage unit 311, an image obtaining unit 312, a feature point extracting unit 313, a frontal degree calculating unit 314, a pattern generating unit 315, a selecting unit 316, a feature extracting unit 317, a registering unit 318, and an authenticating unit 319. The storage unit 311, the pattern generating unit 315, and the selecting unit 316 correspond to the storage unit 111, the pattern generating unit 112 and the selecting unit 113 in FIG. 1, respectively.

An imaging apparatus 302 is, for example, a camera having an imaging device such as a charge-coupled device (CCD) and a complementary metal-oxide-semiconductor (CMOS) and captures video or an image of a subject. Video captured by the imaging apparatus 302 includes a plurality of time series images. An image at each time may also be called a "frame".

The image processing apparatus 301 is a biometric authentication apparatus, for example, and performs biometric information processing based on an image of a registration target person or an authentication target person. When the biometric information processing is registration processing registering biometric information on a registration target person, the subject is a registration target person. When the biometric information processing is authentication processing authenticating an authentication target person, the subject is an authentication target person.

The imaging apparatus 302 captures video or images of a face of a person that is a subject and outputs images included in the captured video or the captured images to the image processing apparatus 301. If the face of the person may be identified, the attitude or movement of the person is not limited. There may be a case where the person stays still with respect to the imaging apparatus 302 and his or her face turns to the imaging apparatus 302 (turns to the front), a case where the person is walking to approach toward the imaging apparatus 302, or a case where the direction of his or her face is changing to look around.

Hereinafter, image processing will be described which is performed when a person is moving toward the imaging apparatus 302 and the face of the person is turning to various directions with changes of his or her facial expression such as blinks.

The image obtaining unit 312 obtains N images 331 (where N is an integer equal to or higher than 2) output from the imaging apparatus 302 and stores them in the storage unit 311. Though the number of images that may be captured varies in accordance with how the person is moving and the positional relationship, for example, between the person and the imaging apparatus 302, N is desirably an integer equal to or higher than 3M in a case where M, a given number, image or images to be processed (M is an integer equal to or higher than 1 and lower than N) is or are to be selected.

The feature point extracting unit 313 extracts feature points each indicating a position of a facial part from each image 331 and stores feature point information 332 indicating a position of the feature point in the storage unit 311. The facial part may be eyes, a nose, a mouth or the like, and the feature point may be pupils, inner corners of the eyes, outer corners of the eyes, a top of the nose, nasal cavities, upper and lower and right and left corners of the mouth or the like.

Figure 4A:
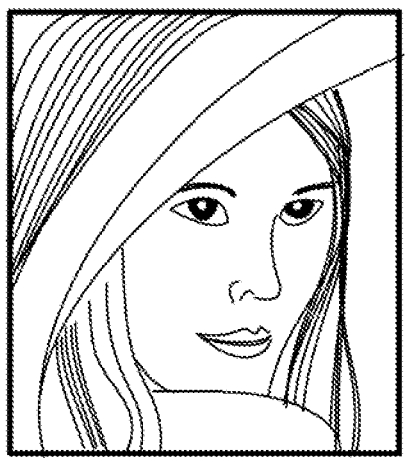
FIGS. 4A and 4B illustrate an image and feature points.
Figure 4B:
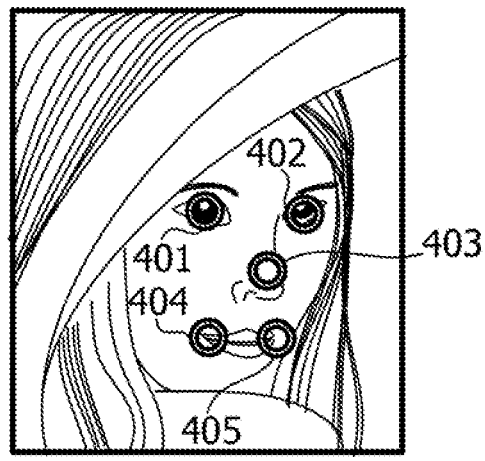

FIGS. 4A and 4B illustrate examples of the image 331 acquired by image-capturing a face of a person and feature points. FIG. 4A illustrates an example of the image 331, and FIG. 4B illustrates examples of feature points extracted from the image 331 in FIG. 4A. A feature point 401 indicates the pupil of the right eye, a feature point 402 indicates the pupil of the left eye, a feature point 403 indicates a top of the nose, a feature point 404 indicates a right end of the mouth, and a feature point 405 indicates a left end of the mouth. For example, the feature point extracting unit 313 may extract those feature points by an object recognition or machine learning method.

However, when the face largely turns to the upper, lower, right or left direction or a part of the face is hidden by a hand of the person, a frame of eye glasses, a mask or the like in image-capturing, an original feature point of the face may not be included in the captured image. In this case, there is a possibility that a shaded part because of a frame of eye glasses, eyebrows or an indentation on the face is improperly detected as a feature point. When a feature point is improperly detected, it is difficult to correctly extract feature information for identifying a person. Therefore, the improper detection may result in a failure of the identity authentication. As a result, it is not preferable that such an image is used for the registration processing or the authentication processing.

The frontal degree calculating unit 314 calculates a frontal degree 333 representing how much the face included in each of the images 331 turns to the front of the imaging apparatus 302 and stores the frontal degree 333 in the storage unit 311.

The frontal degree 333 is also called a face quality value and increases as the distance of the face to the front decreases and decreases as the distance of the face to the front increases.

The pattern generating unit 315 acquires a pixel value pattern 334 indicating a relationship between positions in a given direction and pixel values in an area including a facial part of each of the images 331 and stores the pixel value pattern 334 in the storage unit 311. The given direction may be a top-bottom direction of the face or a right-left direction of the face, for example.

For example, the pattern generating unit 315 calculates a statistic on pixel values from pixel values of a plurality of pixels aligned in a vertical direction about a given direction at positions of the pixels in the given direction. The statistic on pixel values may be a total sum, a mean value or the like. Next, the pattern generating unit 315 acquires, as a pixel value pattern 334, a pattern indicating a relationship between positions of the pixels in the given direction and the statistic. The pattern generating unit 315 calculates a characteristic value 335 indicating a feature of the pixel value pattern 334 by using the pixel value pattern 334 and stores the characteristic value 335 in the storage unit 311.

By using statistics on pixel values of a plurality of pixels aligned in a direction perpendicular to a given direction instead of pixel values of pixels in the given direction, the pixel value pattern 334 reflecting the pixel values of the entire area having a facial part may be acquired. By calculating the characteristic value 335 indicating a feature of the pixel value pattern 334, whether the image 331 is proper for the registration processing and the authentication processing or not may be determined based on the calculated characteristic value 335.

The selecting unit 316 selects M images to be processed based on the frontal degrees 333 and the characteristic values 335 of the N images 331. An image to be processed in the registration processing is an image to be registered, and an image to be processed in the authentication processing is an image to be authenticated.

The feature extracting unit 317 extracts feature information of the face included in the selected image to be processed. For example, the feature information of a face may be positional information indicating positions of parts of the face. The feature extracting unit 317 may extract feature information on the face based on the feature point information 332. In the registration processing, the registering unit 318 stores the extracted feature information in the storage unit 311 as registered biometric information 336 of the registration target person. In the authentication processing, the authenticating unit 319 compares the extracted feature information with the registered biometric information 336 to perform authentication on the authentication target person.

By selecting an image to be processed based on the frontal degree 333, an image 331 having a face at a close distance to the front may be selected as an image to be processed. By using the image 331 having a face directing to the front as an image to be processed, feature information on the face that is proper for the registration processing and the authentication processing may be extracted.

By selecting an image to be processed based on the characteristic value 335 indicating a feature of the pixel value pattern 334, the image 331 including right feature points of the face may be selected as an image to be processed. By using the image 331 including right feature points of the face as an image to be processed, feature information on the face that is proper for the registration processing and the authentication processing may be extracted.

Therefore, with the image processing apparatus 301, even while a person is moving, his or her face is directing toward various directions, and changes of the facial expression are occurring, factors that lower the precision of authentication such as improper detection of a feature point and a change of the facial expression may be excluded, and a proper image to be processed may be selected. As a result, stable identity authentication may be realized.

Next, an example of the calculation of the frontal degree 333 will be described with reference to FIG. 4B. First, the frontal degree calculating unit 314 performs affine transformation on the image 331 such that the feature point 401 and the feature point 402 are at the same height and that the feature point 404 and the feature point 405 are at the same height and thus generates a normalized image.

Next, the frontal degree calculating unit 314 calculates a frontal degree QS of the face in the right-left direction and a frontal degree QH of the face in the top-bottom direction in the normalized image and calculates a frontal degree Q corresponding to the frontal degree 333 by using QS and QH. For example, the frontal degree Q may be a mean value (arithmetic mean, geometric mean, or harmonic mean) of QS and QH.

An x axis and a y axis are set as coordinate axes for the normalized image, and the x axis indicates the horizontal direction of the normalized image, and the y axis indicates the vertical direction of the normalized image. The horizontal direction is the right-left direction of the face, and the vertical direction is the top-bottom direction of the face. In this case, the frontal degree calculating unit 314 calculates QS by using the following expressions, for example.

$$Diff = \sum_{y=0}^{H} \sum_{x=0}^{W/2} \frac{|I(x, y) - I(W - x + 1, y)|}{255} \qquad (1)$$

$$QS = 1 - \frac{Diff}{H * \left(\frac{W}{2}\right)} \qquad (2)$$

W indicates a width of the normalized image, and H indicates a height of the normalized image. I(x,y) in Expression (1) indicates an intensity value at coordinates (x,y) on the normalized image, and I(W−x+1,y) indicates an intensity value at a symmetrical position to the coordinates (x,y) about a bisector that divides the normalized image into two equal parts in the right-left direction.

In this case, Diff in Expression (1) represents a total sum acquired by adding information regarding a difference between intensity values of two pixels present at symmetrical positions about the bisector of the normalized image for the entire normalized image. QS in Expression (2) represents right-left symmetry of the normalized image and increases as Diff decreases. When the normalized image is completely right-left symmetrical, QS is at a maximum. The highest value of QS is 1, and the lowest value of QS is 0. The frontal degree calculating unit 314 may calculate Diff by using an RGB, a color-difference signal or the like of each pixel instead of the intensity value of each pixel.

On the other hand, QH is calculated from a positional relationship of the eyes, the nose, and the mouth included in the normalized image, for example. The feature point extracting unit 313 extracts feature points P1 to P5 from images acquired by image-capturing frontal faces of a plurality of unspecific people in advance. The feature point P1 indicates the pupil of the right eye, the feature point P2 indicates the pupil of the left eye, the feature point P3 indicates a top of the nose, the feature point P4 indicates a right end of the mouth, and the feature point P5 indicates a left end of the mouth. The frontal degree calculating unit 314 calculates a mean Myk and a standard deviation σyk of the y coordinate of the feature point Pk (k=1 to 5).

The frontal degree calculating unit 314 acquires y1 to y5 as y coordinates of the feature points 401 to 405 in the normalized image and calculates QH by the following expression, for example.

$$QH = 1 - \sum_{k=1}^{5} \left( \frac{yk - Myk}{\sigma yk} \right)^2 \quad (3)$$

QH in Expression (3) represents how much the face is directed toward the front in the top-bottom direction and is at a maximum when all yk are matched with Myk and decreases as the difference between yk and Myk increases. However, when the right side of Expression (3) is lower than 0, QH=0 is set. Therefore, the highest value of QH is 1, and the lowest value of QH is 0.

The highest value of Q that is a mean value of QS and QH is 1, and the lowest value of Q is 0. It may be said that the closer to 1 Q is, the closer the face is directed toward the front. When the face turns to the left or the right, QS is lower. Therefore, Q is also lower. When the face turns upward or downward, QH is lower. Therefore, Q is also lower.

However, when improper detection of a feature point occurs, it is difficult to acquire a correct frontal degree 333. Therefore, when an image to be processed is selected by using the frontal degree 333, there is a possibility that an image to be processed that is not proper is selected. Accordingly, the pattern generating unit 315 acquires the pixel value pattern 334 and calculates a characteristic value 335 as an index for selecting an image to be processed.

First, the pattern generating unit 315 decides a partial area including a part of the face in a normalized image. For example, an area including a facial part is used as the partial area, and the partial area is decided by using a feature point indicated by the feature point information 332. An m axis and an n axis are set as coordinate axes for the partial area. The m axis indicates a horizontal direction of the partial area, and the n axis indicates a vertical direction of the partial area. The horizontal direction is perpendicular to the vertical direction.

Figure 5:
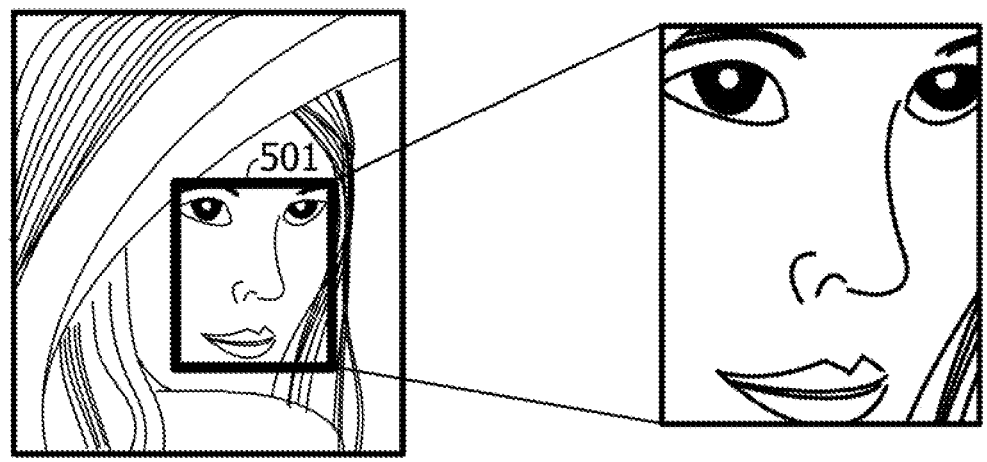
FIG. 5 illustrates a partial area including parts of a face.

FIG. 5 illustrates a partial area including parts of a face. A partial area 501 in FIG. 5 is an area including feature points 401 to 405 illustrated in FIG. 4B.

Next, the pattern generating unit 315 acquires a pixel value pattern 334 by using the vertical direction as the given direction and using an intensity value as the pixel value in the partial area including the eyes, nose and mouth. In this case, at a position n of each pixel in the vertical direction, a total sum L(n) of the intensity values of all pixels aligned in the horizontal direction is calculated, and a light and dark pattern representing a relationship between the position n of each pixel and L(n) is acquired as the pixel value pattern 334 in the vertical direction.

Figure 6A:
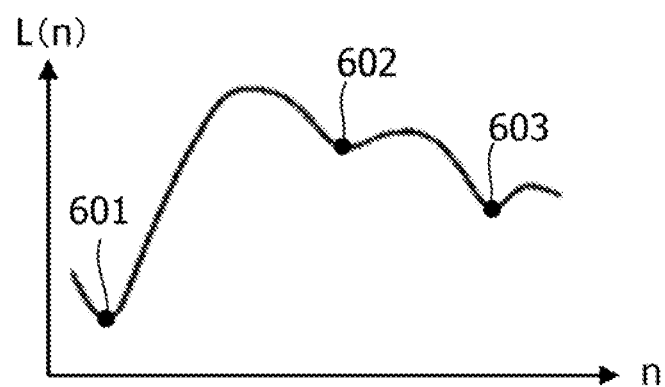
FIGS. 6A and 6B illustrate light and dark patterns in a vertical direction.
Figure 6B:
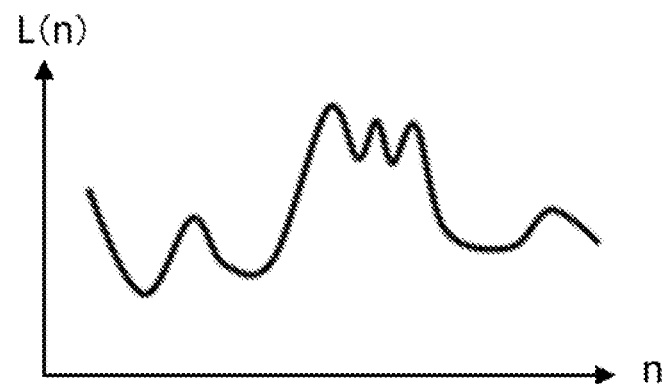

FIGS. 6A and 6B illustrates examples of light and dark patterns in the vertical direction. The horizontal axis indicates the n axis, and the vertical axis indicates L(n). FIG. 6A illustrates an example of a light and dark pattern acquired from the partial area when all of the feature points are correctly detected.

The face of a person is darker at positions of the eyes, nasal cavities and a part between upper and lower lips than the surroundings and lighter at the positions of a top of the nose and upper and lower lips. Therefore, when all of the feature points are correctly detected, L(n) has three minimum values as illustrated in FIG. 6A. A minimum value 601 indicates the position of the right and left eyes, a minimum value 602 indicates the position of nasal cavities, and a minimum value 603 indicates the position of the part between the upper and lower lips.

On the other hand, FIG. 6B illustrates an example of a light and dark pattern acquired from the partial area when improperly detected feature points exist. When improperly detected feature points exist, a horizontal displacement occurs at a height of the right and left eyes, for example. Therefore, as illustrated in FIG. 6B, a light and dark pattern having four or more minimum values is acquired, and the positions of the parts and the positions of the minimum values do not agree.

Accordingly, the pattern generating unit 315 calculates, as the characteristic value 335, a third harmonic component in a frequency characteristic of the pixel value pattern 334. For example, a power spectrum acquired by performing discrete Fourier transform on L(n) may be used as the frequency characteristic of the pixel value pattern 334, and a third harmonic component S3 in the power spectrum may be used as the characteristic value 335.

Because the light and dark pattern in FIG. 6A is a curved line having three minimum values, S3 is high. However, because the light and dark pattern in FIG. 6B is a curved line having many minimum values, S3 is low. Therefore, S3 in the power spectrum of L(n) is used as the characteristic value 335 so that whether the feature points are correctly detected or not may be determined.

The pattern generating unit 315 may also acquire a pixel value pattern 334 by using the horizontal direction as the given direction and using an intensity value as the pixel value in the partial area including the eyes.

Figure 7:
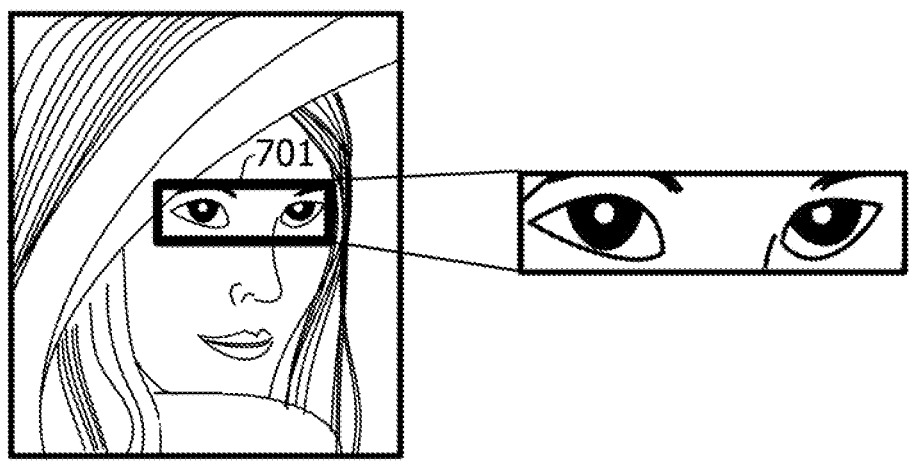
FIG. 7 illustrates a partial area including eyes.

FIG. 7 illustrates an example of a partial area including the eyes. A partial area 701 in FIG. 7 includes the feature point 401 and the feature point 402 illustrated in FIG. 4B and does not include the feature points 403 to 405.

In this case, at a position m of each pixel in the horizontal direction, a total sum H(m) of the intensity values of all pixels aligned in the vertical direction is calculated, and a light and dark pattern representing a relationship between the position m of each pixel and H(m) is acquired as the pixel value pattern 334 in the horizontal direction.

Figure 8A:
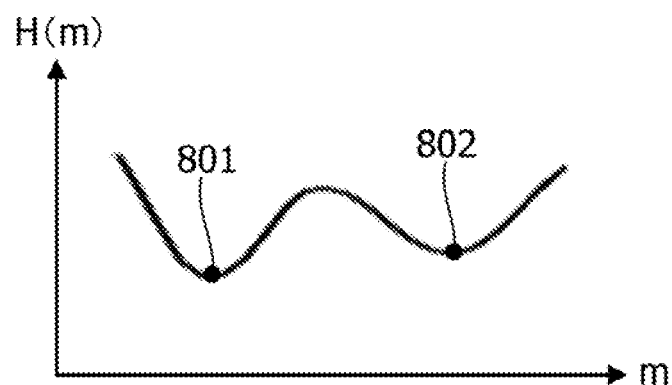
FIGS. 8A and 8B illustrate light and dark patterns in a horizontal direction.
Figure 8B:
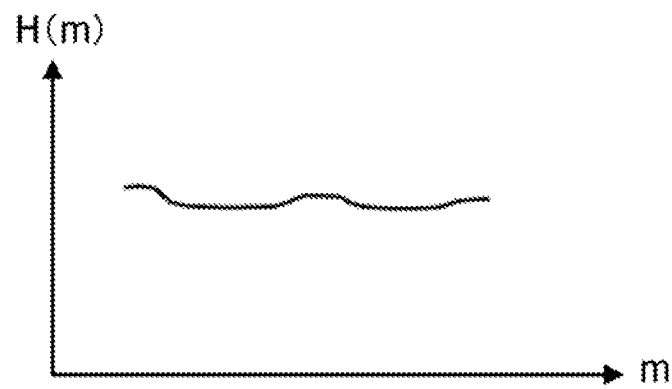

FIGS. 8 and 8B illustrate examples of light and dark patterns in the horizontal direction. The horizontal axis indicates the m axis, and the vertical axis indicates H(m). FIG. 8A illustrates an example of a light and dark pattern acquired from a partial area including the right and left eyes open.

Because the intensity values at the positions of the pupils of the open eyes are lower than the intensity values of the surroundings, H(m) has two minimum values as illustrated in FIG. 8A. A minimum value 801 indicates the position of the right pupil, and a minimum value 802 indicates the position of the left pupil.

On the other hand, FIG. 8B illustrates an example of a light and dark pattern acquired from a partial area including the right and left eyes blinking. While the eyes are blinking, the eyelids cover the pupils. The intensity values at the positions of the pupils are close to the intensity value of the color of the surrounding skin. Therefore, the positions of the minimum values are ambiguous as illustrated in FIG. 8B.

Accordingly, the pattern generating unit 315 calculates, as the characteristic value 335, a second harmonic component in a frequency characteristic of the pixel value pattern 334. For example, a power spectrum acquired by performing discrete Fourier transform on H(m) may be used as the frequency characteristic of the pixel value pattern 334, and a second harmonic component S2 in the power spectrum may be used as the characteristic value 335.

Because the light and dark pattern in FIG. 8A is a curved line having two minimum values, S2 is high. However, because the light and dark pattern in FIG. 8B is a curved line having unclear minimum values, S2 is low. Therefore, S2 in the power spectrum of H(m) is used as the characteristic value 335 so that the presence of blinking may be determined.

The pattern generating unit 315 may acquire both of a light and dark pattern in the vertical direction and a light and dark pattern in the horizontal direction and calculate characteristic values of the light and dark patterns. In this case, S3 in the power spectrum of L(n) and S2 in the power spectrum of H(m) may be used as the characteristic values 335.

The pattern generating unit 315 may also calculate the characteristic value 335 by using information excluding the frequency characteristics of the pixel value pattern 334. For example, the pattern generating unit 315 calculates in advance a mean Lmean(n) of L(n) from images acquired by image-capturing frontal faces of a plurality of unspecific people and calculates a total sum Esum of errors between L(n) acquired from the images 331 and Lmean(n).

$$Esum = \sum_{n=1}^{Hp} |Lmean(n) - L(n)| \quad (4)$$

Hp in Expression (4) represents a height of a partial area used for acquiring a light and dark pattern in the vertical direction. Esum is low when feature points are correctly detected and is high when an improperly detected feature point exists. Therefore, Esum is used as the characteristic value 335 so that whether a feature point or feature points are correctly detected or not may be determined.

The pattern generating unit 315 may calculate the characteristic value 335 by using an RGB, a color-difference signal or the like of each pixel instead of the intensity value of each pixel.

The selecting unit 316 calculates a statistic on the characteristic values 335 from the characteristic values 335 of N images 331 and refers to the N characteristic values 335 in decreasing order of the frontal degrees 333. Examples of the statistic on the characteristic value 335 include a mean value, a median value, and a mode value.

The selecting unit 316 repeats an operation of, when a difference between the referred characteristic value 335 and the statistic is higher than a threshold value, referring to the characteristic value 335 of the next image 331 and, when the difference is lower than the threshold value, selecting the image 331 having the referred characteristic value 335 as an image to be processed. Thus, M image or images 331 are selected as images to be processed.

The N characteristic values 335 are referred in decreasing order of the frontal degrees 333 so that images 331 including the face turning in the direction close to the front may be selected as images to be processed by priority and that the efficiency of the processing of selecting images to be processed may be increased.

Figure 9:
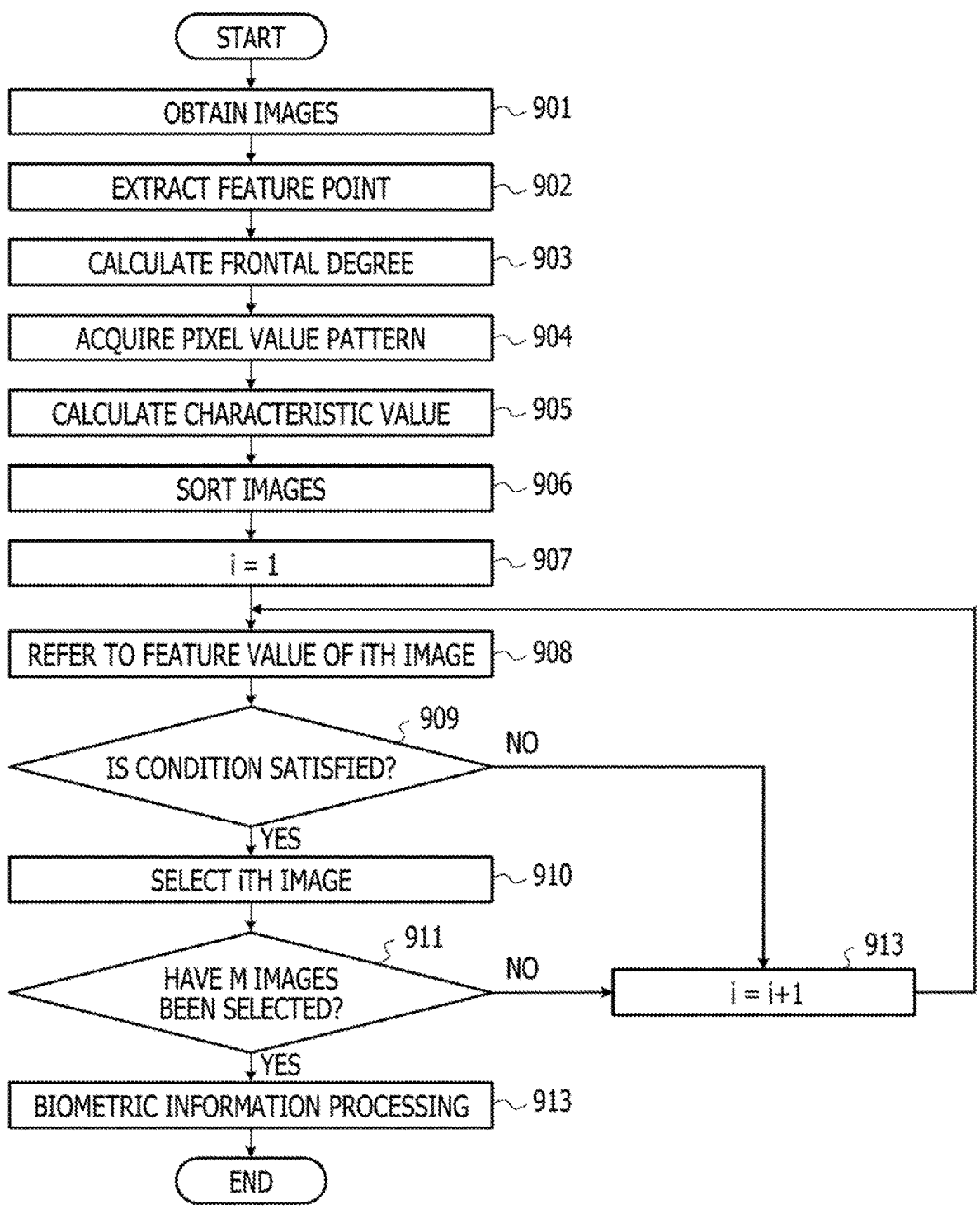
FIG. 9 is a flowchart illustrating a specific example of image processing.

FIG. 9 is a flowchart illustrating a specific example of image processing to be performed by the image processing apparatus 301 in FIG. 3. The image obtaining unit 312 obtains N images 331 output from the imaging apparatus 302 (step 901). The feature point extracting unit 313 extracts feature points indicating positions of parts of a face from each of the images 331 and generates feature point information 332 indicating positions of the feature points (step 902).

The frontal degree calculating unit 314 calculates the frontal degree 333 of each of the images 331 by using the feature points indicated by the feature point information 332 (step 903). For example, the frontal degree calculating unit 314 calculates Q(j) indicating a mean value of the frontal degree QS in the right-left direction and the frontal degree QH in the top-bottom direction of the face as the frontal degree 333 of the jth image 331 (j=1 to N).

The pattern generating unit 315 acquires a pixel value pattern 334 of each of the images 331 by using the feature points indicated by the feature point information 332 (step 904) and calculates the characteristic value 335 by using the pixel value pattern 334 (step 905).

Hereinafter, the characteristic value 335 of the jth image 331 is written as C(j). For example, as C(j), S3(j) indicating a third harmonic component in the power spectrum of L(n), S2(j) indicating a second harmonic component in the power spectrum of H(m), or Esum(j) indicating a total sum of errors between L(n) and Lmean(n) is used.

The selecting unit 316 calculates a mean value MC and a standard deviation σC of C(1) to C(N) and sorts the images 331 and C(j) in decreasing order of Q(j) (step 906).

The selecting unit 316 sets 1 as a control variable i indicating each of the images 331 (step 907) and refers to C(i) of the ith image 331 in the order after the sorting (step 908). The selecting unit 316 checks whether C(i) satisfies a given condition or not (step 909). For example, the given condition is that D(i) of the following expression is lower than a threshold value.

$$D(i)=|C(i)-MC|/\sigma C \quad (5)$$

D(i) of Expression (5) represents a difference between C(i) and MC. Accordingly, the selecting unit 316 compares D(i) and a threshold value.

When D(i) is equal to or higher than the threshold value (NO in step 909), the selecting unit 316 increments i by 1 (step 913) and repeats the processing in step 908 and subsequent steps without selecting the ith image 331.

On the other hand, when D(i) is lower than the threshold value (YES in step 909), the selecting unit 316 selects the ith image 331 as an image to be processed (step 910) and checks whether M images 331 have been selected as images to be processed or not (step 911).

When M images 331 have not been selected (NO in step 911), the selecting unit 316 repeats the processing in step 913 and subsequent steps.

When M images 331 have been selected (YES in step 911), the feature extracting unit 317 extracts feature information on the face from each of the images to be processed, and the registering unit 318 or the authenticating unit 319 performs biometric information processing (step 912). When the biometric information processing is the registration processing, the registering unit 318 registers the extracted feature information with the storage unit 311 as registered biometric information 336 on the registration target person. When the biometric information processing is the authentication processing, the authenticating unit 319 compares the extracted feature information with the registered biometric information 336 to perform authentication on the authentication target person.

For example, when S3(i) is used as C(i) and when improper detection of a feature point occurs, S3(i) is lower. Therefore, D(i) is higher. As a result, such an image 331 is excluded from the images to be processed, and the reduction of precision of authentication due to the improper detection of a feature point may be suppressed.

On the other hand, when S2(i) is used as C(i) and while the eyes are blinking, S2(i) is lower. Therefore, D(i) is higher. As a result, such an image 331 is excluded from the images to be processed, and the reduction of precision of authentication due to the blinking may be suppressed.

When Esum(i) is used as C(i) and when improper detection of a feature point occurs, Esum(i) is higher. Therefore, D(i) is higher. As a result, such an image 331 is excluded from the images to be processed, and the reduction of precision of authentication due to the improper detection of a feature point may be suppressed.

By acquiring D(i) based on the mean value MC and the standard deviation σC of the characteristic values 335 of N images 331 of an identical person, a proper image 331 may be selected without depending on an individual difference such as the shape of a facial part and positional relationship between parts.

When the imaging apparatus 302 captures video of a face of a person and outputs the video to the image processing apparatus 301, a plurality of frames included in the video are captured at the same sequence. Therefore, a change between images of two frames that are adjacent in time series is often small. However, in order to select a plurality of images to be processed, more changes of the selected images to be processed may be associated with more attitude changes.

In this case, in step 901, the image obtaining unit 312 refers to the captured times of the images output from the imaging apparatus 302 in order of captured times. The image obtaining unit 312 repeats operations of, when a difference between the referred captured time and the captured time of the immediately previously obtained image is shorter than a given time, referring to the captured time of the next image is referred and, when the difference is longer than the given time, obtaining the image having the referred captured time. Thus, N images 331 are obtained at time intervals equal to or longer than the given time.

Figure 10:
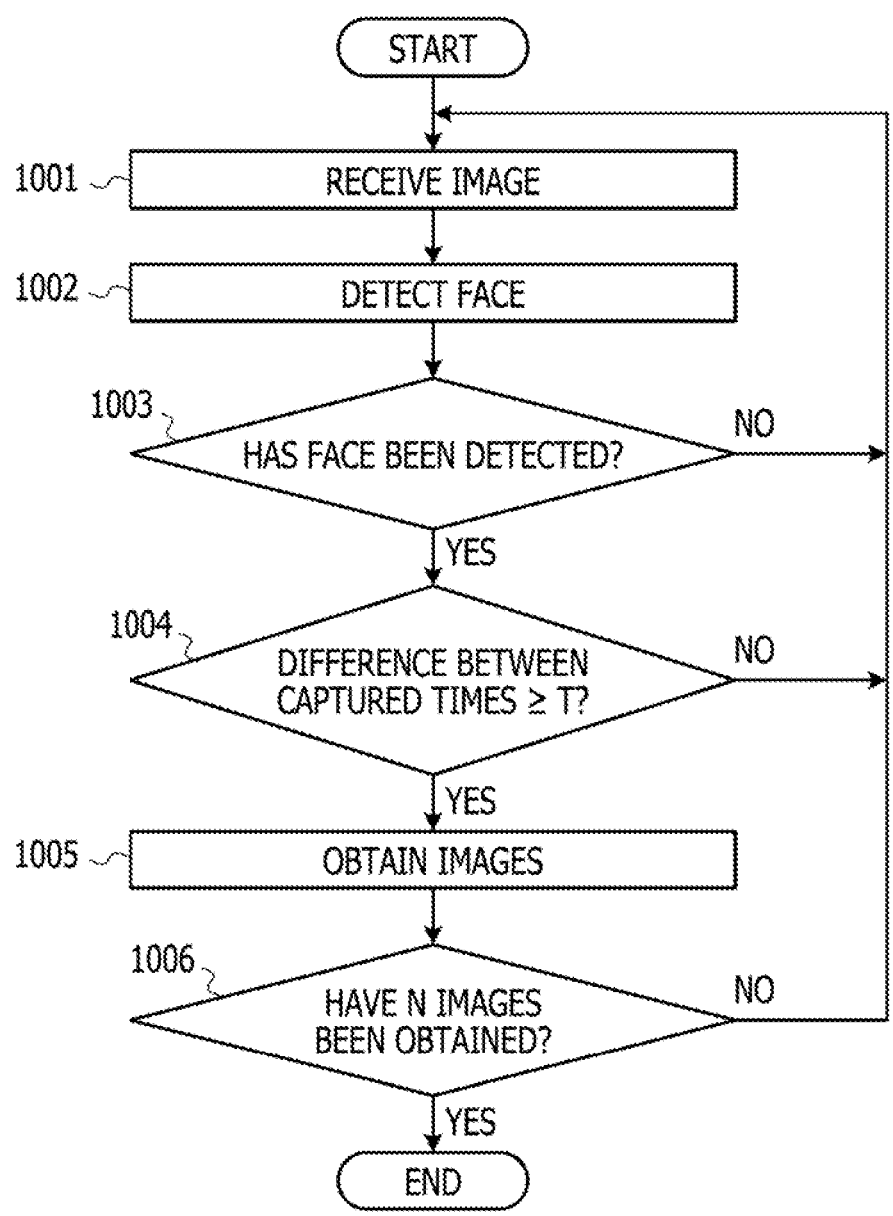
FIG. 10 is a flowchart of image obtaining processing.

FIG. 10 is a flowchart illustrating an example of the image obtaining processing in step 901. the image obtaining unit 312 receives an image from the imaging apparatus 302 (step 1001), performs face detection processing of detecting a face from the received image (step 1002) and determines whether a face has been detected or not (step 1003). When a face has not been detected (NO in step 1003), the image obtaining unit 312 abandons the received image and repeats the processing in step 1001 and subsequent steps.

On the other hand, when a face has been detected (YES in step 1003), the image obtaining unit 312 compares a difference between the captured time of the received image and the captured time of the immediately previously obtained image with a given time T (step 1004). When the difference is shorter than T (NO in step 1004), the image obtaining unit 312 repeats the processing in step 1001 and subsequent steps.

On the other hand, when the difference is equal to or longer than T (YES in step 1004), the image obtaining unit 312 obtains the received image and stores it in the storage unit 311 as an image 331 (step 1005). In this case, the captured time of the received image is also stored in the storage unit 311 along with the image 331.

The image obtaining unit 312 checks whether N images 331 have been obtained or not (step 1006). When N images 331 have not been obtained (NO in step 1006), the image obtaining unit 312 repeats the processing in step 1001 and subsequent steps. When N images 331 have been obtained (YES in step 1006), the image obtaining unit 312 exits the processing.

According to the image obtaining processing in FIG. 10, N images 331 having a large image change therebetween may be obtained at time intervals equal to or longer than a given time from video output from the imaging apparatus 302.

The image processing apparatus 301 may select images to be processed by using a plurality of types of pixel value patterns 334 in combination. For example, as the plurality of types of pixel value patterns 334, two types of pixel value patterns 334 in the vertical direction and the horizontal direction may be used.

Figure 11:
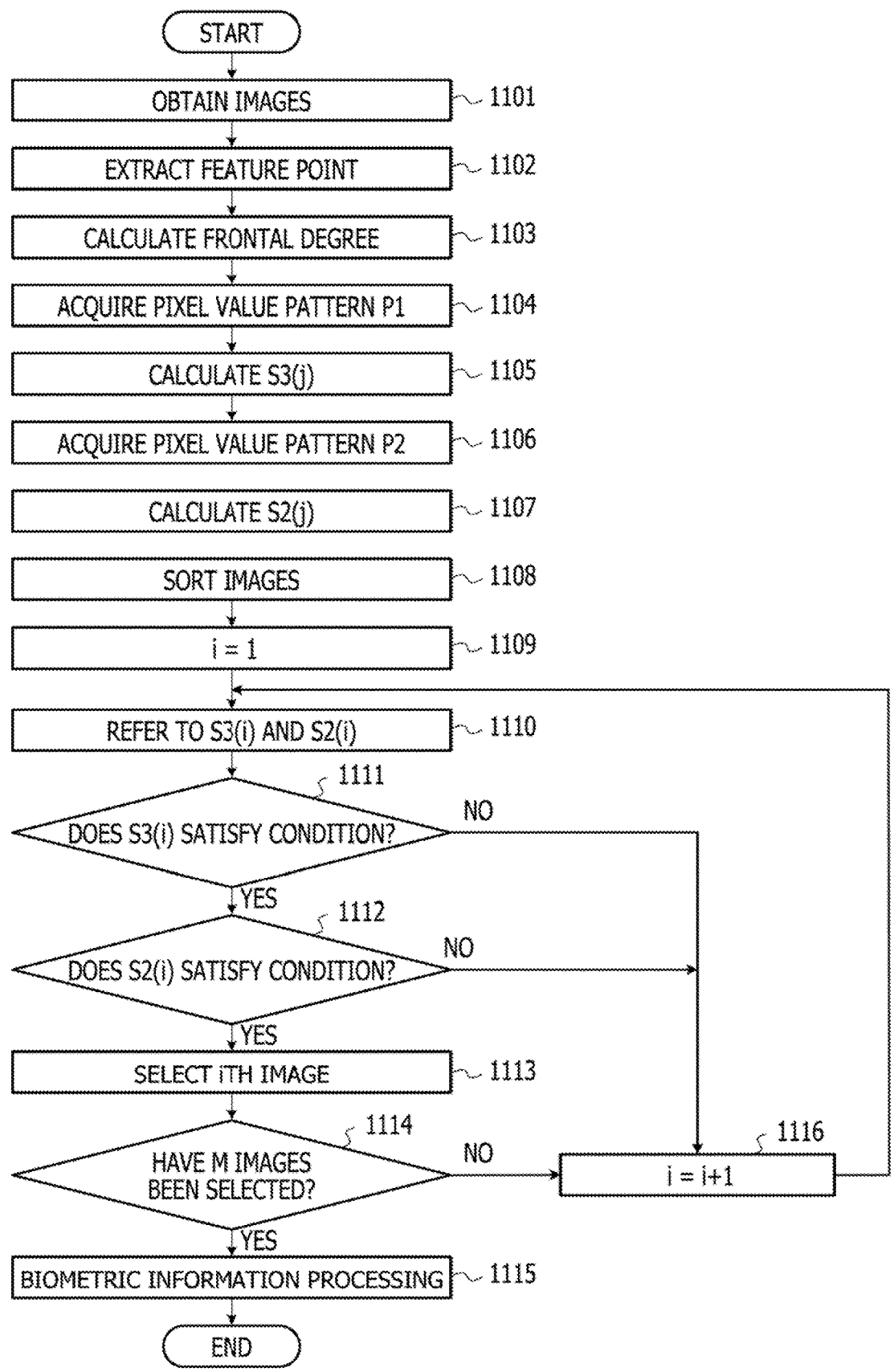
FIG. 11 is a flowchart illustrating a specific example of image processing using two types of pixel value patterns.

FIG. 11 is a flowchart illustrating a specific example of image processing using the two types of pixel value patterns 334. The processing in steps 1101 to 1103 and steps 1113 to 1116 in FIG. 11 is the same as the processing in steps 901 to 903 and steps 910 to 913 in FIG. 9.

After the frontal degrees. 333 of the images 331 are calculated, the pattern generating unit 315 acquires a pixel value pattern P1 in the vertical direction of each of the images 331 by using the feature points indicated by the feature point information 332 (step 1104). The pattern generating unit 315 calculates S3(j) representing a third harmonic component in the power spectrum of L(n) by using the pixel value pattern P1 (step 1105).

The pattern generating unit 315 acquires a pixel value pattern P2 in the horizontal direction of each of the images 331 by using the feature points indicated by the feature point information 332 (step 1106). The pattern generating unit 315 calculates S2(j) representing a second harmonic component in the power spectrum of H(m) by using the pixel value pattern P2 (step 1107).

The selecting unit 316 calculates a mean value and a standard deviation of S3(1) to S3(N) and a mean value and a standard deviation of S2(1) to S2(N) and sorts the images 331, S3(j) and S2(j) in decreasing order of Q(j) (step 1108).

The selecting unit 316 sets 1 as a control variable i indicating each of the images 331 (step 1109) and refers to S3(i) and S2(i) of the ith image 331 in the order after the sorting (step 1110). The selecting unit 316 checks whether S3(i) satisfies a given condition or not (step 1111). The condition in step 1111 is the same as the condition in step 909 in FIG. 9.

When S3(i) does not satisfy the given condition (NO in step 1111), the selecting unit 316 repeats the processing in step 1116 and subsequent steps. On the other hand, when S3(i) satisfies the given condition (YES in step 1111), whether S2(i) satisfies a given condition or not is checked (step 1112). The condition in step 1112 is the same as the condition in step 909 in FIG. 9.

When S2(i) does not satisfy the given condition (NO in step 1112), the selecting unit 316 repeats the processing in step 1116 and subsequent steps. On the other hand, when S2(i) satisfies the given condition (YES in step 1112), the selecting unit 316 selects the ith image 331 as an image to be processed (step 1113) and performs the processing in step 1114 and subsequent steps.

According to the image processing in FIG. 11, an image 331 from which improper detection of a feature point occurs and an image 331 with the eyes blinking may be excluded from images to be processed. Therefore, the precision of authentication may be improved, compared with a case where one type of pixel value pattern 334 is used.

The configurations of the image processing apparatus 101 in FIG. 1 and the image processing apparatus 301 in FIG. 3 are merely examples, and some components may be omitted or changed according to the use or conditions of the image processing apparatus. For example, in the image processing apparatus 301 in FIG. 3, the image obtaining unit 312 may be omitted when N images 331 are stored in advance in the storage unit 311.

The feature point extracting unit 313 may be omitted when feature points are not used for the calculations of the frontal degree 333 and the characteristic value 335.

The frontal degree calculating unit 314 may be omitted when the frontal degree 333 is not used for selecting an image to be processed.

The feature extracting unit 317, the registering unit 318, and the authenticating unit 319 may be omitted when the biometric information processing is performed by an external device. The image processing apparatus 301 may perform other information processing by using an image to be processed instead of performing the biometric information processing by using an image to be processed.

The flowcharts in FIG. 2 and FIGS. 9 to 11 are merely examples, and a part of the processing may be omitted or changed according to the configuration or conditions of the image processing apparatus. For example, in the image processing in FIGS. 9 and 11, when N images 331 are stored in advance in the storage unit 311, the processing in step 901 and step 1101 may be omitted.

The processing in step 902 and step 1102 may be omitted when feature points are not used for the calculations of the frontal degree 333 and the characteristic value 335. The processing in step 903, step 906, step 1103, and step 1108 may be omitted when the frontal degree 333 is not used for selecting an image to be processed.

The processing in step 912 and step 1115 may be omitted when the biometric information processing is performed by an external device. The image processing apparatus 301 may perform other information processing in step 912 and step 1115 instead of the biometric information processing. The image processing apparatus 301 may use another condition excluding the condition that D(i) is lower than the threshold value in step 909, step 1111, and step 1112.

The processing in step 1002 and step 1003 may be omitted when it is certain that a face is included in images output from the imaging apparatus 302 in the image obtaining processing in FIG. 10.

The images and feature points in FIG. 4B, the partial areas in FIGS. 5 and 7, and the light and dark patterns in FIGS. 6 and 8 are merely examples, and the images, the feature points, the partial areas, and the light and dark patterns vary in accordance with the person being a subject. Expressions (1) to (5) are merely examples, and the image processing apparatus 301 may perform image processing by using other computation expressions.

Figure 12:
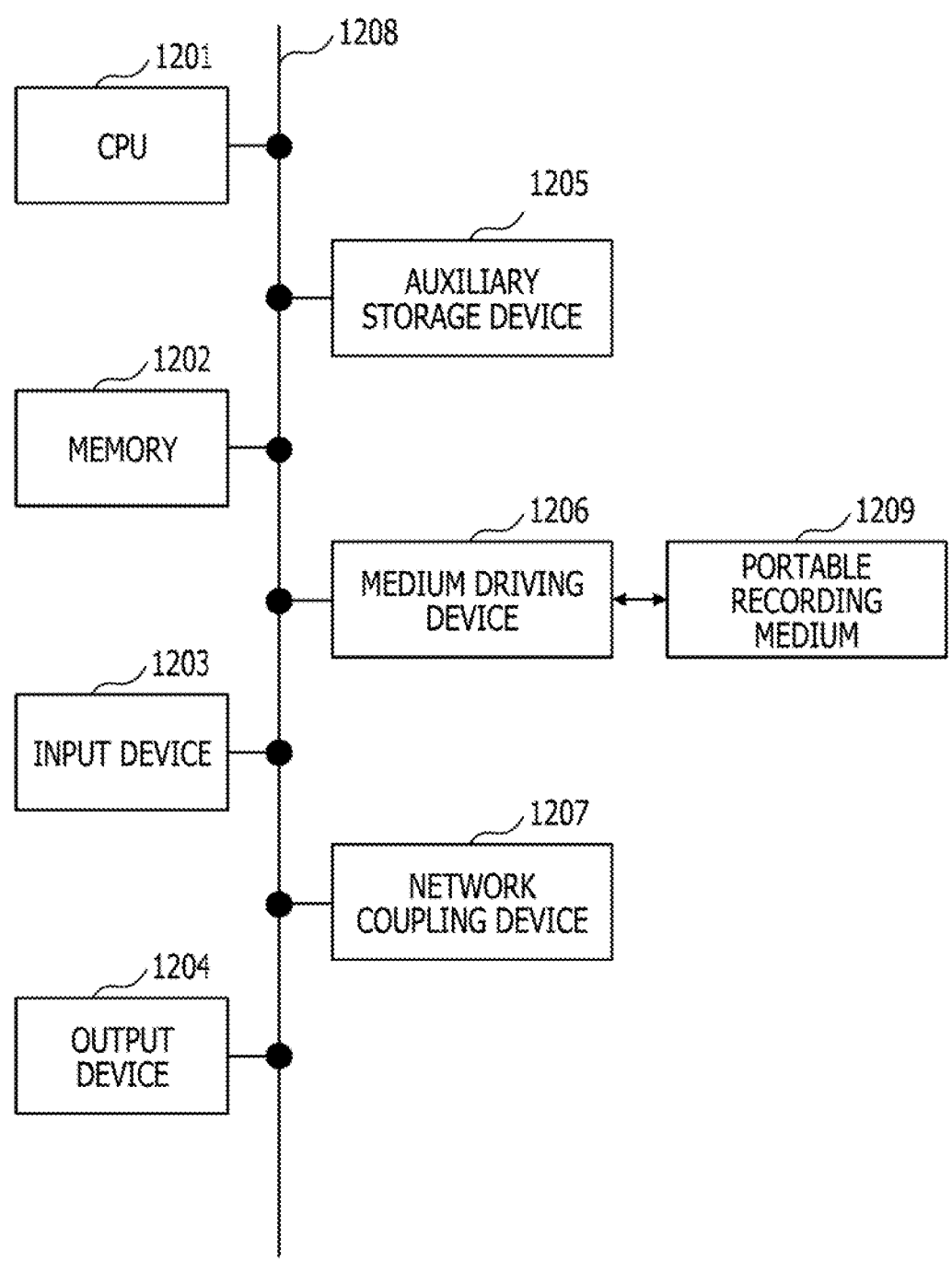
FIG. 12 is a hardware configuration diagram of the information processing apparatus.

FIG. 12 illustrates a hardware configuration example of an information processing apparatus (computer) used as the image processing apparatus 101 in FIG. 1 and the image processing apparatus 301 in FIG. 3. The information processing apparatus in FIG. 12 includes a central processing unit (CPU) 1201, a memory 1202, an input device 1203, an output device 1204, an auxiliary storage device 1205, a medium driving device 1206, and a network coupling device 1207. These constituents are pieces of hardware and are coupled to each other by a bus 1208. The imaging apparatus 302 in FIG. 3 may be coupled to the bus 1208.

The memory 1202 is, for example, a semiconductor memory such as a read-only memory (ROM), a random-access memory (RAM), or a flash memory, and stores therein programs and data used for processing. The memory 1202 may be used as the storage unit 111 illustrated in FIG. 1 or the storage unit 311 illustrated in FIG. 3.

The CPU 1201 (processor) executes, for example, a program by using the memory 1202 to operate as the pattern generating unit 112 and the selecting unit 113 in FIG. 1. The CPU 1201 also operates as the image obtaining unit 312, the feature point extracting unit 313, the frontal degree calculating unit 314, the pattern generating unit 315, the selecting unit 316, the feature extracting unit 317, the registering unit 318 and the authenticating unit 319 in FIG. 3 by executing the program by using the memory 1202.

The input device 1203 is, for example, a keyboard, a pointing device, or the like and is used for input of instructions or information from an operator or a user. The output device 1204 is, for example, a display device, a printer, a speaker, or the like, and is used for output of inquiries or instructions to the operator or the user and output of processing results. The processing result may be an authentication result indicating a success or a failure of an authentication.

The auxiliary storage device 1205 is, for example, a magnetic disk drive, an optical disk drive, a magneto-optical disk drive, a tape drive, or the like. The auxiliary storage device 1205 may be a hard disk drive or a flash memory. The information processing apparatus stores a program and data in the auxiliary storage device 1205 and may use the program and data by loading them into the memory 1202. The auxiliary storage device 1205 may be used as the storage unit 111 illustrated in FIG. 1 or the storage unit 311 illustrated in FIG. 3.

The medium driving device 1206 drives a portable recording medium 1209 and accesses data recorded therein. The portable recording medium 1209 is a memory device, a flexible disk, an optical disk, a magneto-optical disk, or the like. The portable recording medium 1209 may be a compact disc read-only memory (CD-ROM), a digital versatile disc (DVD), a Universal Serial Bus (USB) memory, or the like. The operator or the user may store a program and data in the portable recording medium 1209 and use the program and data by loading them into the memory 1202.

A computer-readable recording medium in which a program and data to be used for processing are stored as described above is a physical (non-transitory) recording medium like the memory 1202, the auxiliary storage device 1205, or the portable recording medium 1209.

The network coupling device 1207 is a communication interface circuit that is coupled to a communication network such as a local area network (LAN) or a wide area network (WAN) and that performs data conversion involved in communication. The information processing apparatus may receive programs and data from external devices via the network coupling device 1207 and use the programs and data by loading them into the memory 1202.

The information processing apparatus does not have to include all the constituent elements in FIG. 12, and part of the constituent elements may be omitted depending on its usage or conditions. For example, if an interface with an operator or a user is unnecessary, the input device 1203 and the output device 1204 may be omitted. In a case where the portable recording medium 1209 or the communication network is not used, the medium driving device 1206 or the network coupling device 1207 may be omitted.

While the embodiment of the disclosure and advantages thereof have been described in detail, those skilled in the art may make various changes, additions, and omissions without departing from the scope of the invention, which is set forth in the appended claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus, comprising:
    a memory that stores a plurality of images acquired by image-capturing a face of a person; and
    a processor, coupled to the memory, configured to:
    acquire a pixel value pattern indicating a relationship between positions in a given direction and pixel values in an area having parts of the face of each of the plurality of images;
    select an image to be processed from the plurality of images based on the pixel value patterns of the plurality of images; and
    at positions of pixels in the given direction, calculate a statistic on pixel values from pixel values of a plurality of pixels aligned in a direction perpendicular to the given direction, acquire, as the pixel value pattern, a pattern indicating a relationship between positions of pixels in the given direction and the statistic, calculate a harmonic component in a frequency characteristic of the pixel value pattern as a characteristic value by using the pixel value pattern, and select the image to be processed based on the characteristic values of the plurality of images.

2. The image processing apparatus according to claim 1, wherein, in an area including eyes, a nose, and a mouth as the parts of the face, the processor acquires the pixel value pattern by using a top-bottom direction of the face as the given direction and using intensity values as the pixel values and calculates a third harmonic component in a frequency characteristic of the pixel value pattern as the characteristic value.

3. The image processing apparatus according to claim 1, wherein, in an area including eyes as the parts of the face, the processor acquires the pixel value pattern by using a right-left direction of the face as the given direction and using intensity values as the pixel values and calculates a second harmonic component in a frequency characteristic of the pixel value pattern as the characteristic value.

4. The image processing apparatus according to claim 1, wherein, in an area including eyes, a nose, and a mouth as the parts of the face, the processor acquires a pixel value pattern in a top-bottom direction of the face by using the top-bottom direction of the face as the given direction and using intensity values as the pixel values and calculates a third harmonic component in a frequency characteristic of the pixel value pattern in the top-bottom direction of the face as the characteristic value, and, in an area including the eyes as the parts of the face, acquires a pixel value pattern in a right-left direction of the face by using the right-left direction of the face as the given direction and using intensity values as the pixel values, calculates a second harmonic component in the frequency characteristic of the pixel value pattern in the right-left direction of the face as the characteristic value and selects the image to be processed based on the third harmonic component of each of the plurality of images and the second harmonic component of each of the plurality of images.

5. The image processing apparatus according to claim 1, wherein the processor
    calculates a frontal degree indicating how much the face included in each of the plurality of images turns to the front, and
    selects an image to be processed based on the characteristic value of each of the plurality of images and the frontal degree of each of the plurality of images.

6. The image processing apparatus according to claim 5, wherein the processor selects a given number of images as the images to be processed by repeating operations of calculating a statistic of each of the plurality of images, referring to characteristic values of the plurality of images in decreasing order of the frontal degrees, and, when a difference between the referred characteristic value and the statistic on the characteristic value is higher than a threshold value, referring to the characteristic value of a next image, and when the difference is lower than the threshold value, selecting the image having the referred characteristic value as the image to be processed.

7. The image processing apparatus according to claim 1, wherein the processor obtains the plurality of images by repeating operations of referring to a captured time of an image including the face in order of captured times, and when a difference between the referred captured time and the captured time of an immediately previously obtained image is shorter than a given time, referring to a captured time of a next image, and when the difference between the referred captured time and the captured time of the immediately previously obtained image is longer than the given time, obtaining the image having the referred captured time.

8. The image processing apparatus according to claim 1, wherein the image to be processed is an image to be registered or to be authenticated.

9. A non-transitory computer-readable storage medium having stored therein a program for causing a processor to execute a process, the process comprising:
    acquiring a pixel value pattern indicating a relationship between positions in a given direction and pixel values in an area having parts of a face of each of the plurality of images acquired by image-capturing a face of a person;
    selecting an image to be processed from the plurality of images based on the pixel value patterns of the plurality of images; and
    at positions of pixels in the given direction, calculating a statistic on pixel values from pixel values of a plurality of pixels aligned in a direction perpendicular to the given direction, acquiring, as the pixel value pattern, a pattern indicating a relationship between positions of pixels in the given direction and the statistic, calculating a harmonic component in a frequency characteristic of the pixel value pattern as a characteristic value by using the pixel value pattern, and selecting the image to be processed based on the characteristic values of the plurality of images.

10. The non-transitory computer-readable storage medium according to claim 9, wherein, in an area including eyes, a nose, and a mouth as the parts of the face, the processor acquires the pixel value pattern by using a top-bottom direction of the face as the given direction and using intensity values as the pixel values and calculates a third harmonic component in a frequency characteristic of the pixel value pattern as the characteristic value.

11. A method of causing a computer to execute processing, comprising:
    acquiring a pixel value pattern indicating a relationship between positions in a given direction and pixel values in an area having parts of a face of each of the plurality of images acquired by image-capturing a face of a person; and
    selecting an image to be processed from the plurality of images based on the pixel value patterns of the plurality of images,
    at positions of pixels in the given direction, calculating a statistic on pixel values from pixel values of a plurality of pixels aligned in a direction perpendicular to the given direction, acquiring, as the pixel value pattern, a pattern indicating a relationship between positions of pixels in the given direction and the statistic, calculating a harmonic component in a frequency characteristic of the pixel value pattern as a characteristic value by using the pixel value pattern, and selecting the image to be processed based on the characteristic values of the plurality of images.

12. The method according to claim 11, wherein, in an area including eyes, a nose, and a mouth as the parts of the face, the processor acquires the pixel value pattern by using a top-bottom direction of the face as the given direction and using intensity values as the pixel values and calculates a third harmonic component in a frequency characteristic of the pixel value pattern as the characteristic value.

* * * * *